(12) United States Patent
Kirk et al.

(10) Patent No.: US 6,867,780 B1  
(45) Date of Patent: Mar. 15, 2005

(54) SYSTEM, METHOD AND ARTICLE OF MANUFACTURE FOR ALLOWING DIRECT MEMORY ACCESS TO GRAPHICS VERTEX DATA WHILE BYPASSING A PROCESSOR

(75) Inventors: David B. Kirk, San Francisco, CA (US); Paolo E. Sabella, Pleasanton, CA (US); Charles M. Flaig, San Jose, CA (US); Mark J. Kilgard, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 09/454,518

(22) Filed: Dec. 6, 1999

(51) Int. Cl.[7] ............................................. G06F 15/80
(52) U.S. Cl. ....................................... 345/505; 345/506
(58) Field of Search .................. 717/153, 147, 717/143; 710/24, 26; 345/722, 522, 505, 420, 421, 506, 582, 502; 712/22; 709/219, 236; 711/137

(56) References Cited

U.S. PATENT DOCUMENTS 5,291,582 A * 3/1994 Drako et al. ................ 710/26
6,202,130 B1 * 3/2001 Scales, III et al. .......... 711/137

OTHER PUBLICATIONS http://oss.sgi.com/projects/ogl-sample/registry/ maintained by Silicon Graphics Inc. under Non-ARB Extension No. 30 p. 1.*

Mark Segal and Kirt Akeley; "The OpenGL Graphics System: A Specification"; Mar. 4, 1997; Silicon Graphics, Inc.

* cited by examiner

*Primary Examiner*—Matthew C. Bella
*Assistant Examiner*—Dalip K. Singh
(74) *Attorney, Agent, or Firm*—Zilka-Kotab, PC; Kevin J. Zilka

(57) ABSTRACT

A system, method, and article of manufacture are provided for allowing direct memory access to graphics vertex data by a graphics accelerator module. First, vertex data is stored in memory. Next, an index is received which is representative of a portion of the vertex data in the memory. A location is then determined in the memory in which the portion of the vertex data is stored. Such portion of the vertex data may thereafter be directly retrieved from the determined location in the memory while bypassing a processor.

27 Claims, 6 Drawing Sheets

SYSTEM, METHOD AND ARTICLE OF MANUFACTURE FOR ALLOWING DIRECT MEMORY ACCESS TO GRAPHICS VERTEX DATA WHILE BYPASSING A PROCESSOR

FIELD OF THE INVENTION

The present invention relates generally to computer graphics and, more particularly, to a system and method for accessing graphics vertex data.

BACKGROUND OF THE INVENTION

In graphics processing, much data is managed in order to provide a resultant image on a computer display. One form of such data includes vertex data that comprises information for displaying triangles, lines, points or any other type of portions of an image on the computer display. Prior Art Table 1 includes an example of typical vertex data.

Prior Art Table 1 position(X Y Z W)
diffuse(R G B A)
specular(R G B F)
texture0(S T R Q)
texture1(S T R Q)

Together, multiple sets of such vertex data are used to represent one of the portions of the image. In order to accomplish this, each vertex, on average, requires 40 bytes of memory storage space. During conventional system operation, over 10 million vertexes are typically exchanged every second during processing. This results in a data transfer rate of 400 MB/s.

During the processing of vertex data, various components of a system come into play. Prior Art FIG. 1 illustrates an example of a system 100 that processes vertex data. As shown, included are a processor 102, system memory 104, a graphics accelerator module 106, and a bus 108 for allowing communication among the various components.

In use, the processor 102 locates the vertex data in the system memory 104. The vertex data is then routed to the processor 102, after which the vertex data is copied for later use by the graphics accelerator module 106. The graphics accelerator module 106 may perform various operations such as transform and/or lighting operations on the vertex data.

As mentioned earlier, a typical data transfer rate of 400 MB/s is required in current systems to process the vertex data. During the transfer of such data in the system 100 of Prior Art FIG. 1, the bus 108 connecting the processor 102 and the graphics accelerator module 106 is required to handle an input data transfer rate of 400 MB/s along with an output data transfer rate of 400 MB/s.

As such, the foregoing bus 108 must accommodate a data transfer rate of 800 MB/s while handling the vertex data. Conventionally, such bus 108 is 64 bits wide and the processor 102 runs at about 100 MHz. Therefore, the bus 108 is often strained during use in the system 100 of Prior Art FIG. 1. Further, with data transfer rates constantly rising, processors will soon not be able to be used to copy vertex data.

There is therefore a need for a system that allows direct memory access to vertex data while bypassing the processor in order to avoid overloading the processor and associated bus.

DISCLOSURE OF THE INVENTION

A system, method, and article of manufacture are provided for allowing direct memory access to graphics vertex data by a graphics accelerator module. First, vertex data is stored in memory. Next, an index is received which is representative of a portion of the vertex data in the memory. A location is then determined in the memory in which the portion of the vertex data is stored. Such portion of the vertex data may thereafter be directly retrieved from the determined location in the memory while bypassing a processor.

In one aspect of the present invention, the memory in which the vertex data is stored may include system memory or graphics memory associated with the graphics accelerator module. Further, the location in the memory may be determined by carrying out a calculation using the index. In one embodiment, the calculation includes multiplying the index by a stride value and adding an offset value thereto in order to determine the location in the memory.

In another aspect of the present invention, the vertex data includes a plurality of components. Each of such components has an associated stride value and offset value that are used in the foregoing calculation. By assigning each component different values, the various components may be stored in an interleaved, independent, and/or mixed manner.

In addition to the stride and offset values, each of the components of the vertex data may have an associated format value indicative of a size of the corresponding component of the vertex data. This enables the capability of foregoing the retrieval of unwanted data. It should be noted that various other types of flags may also be employed to convey information other than the size of the components of the vertex data.

In still yet another aspect of the present invention, the method may include additional operations after retrieving the portion of the vertex data. For example, the portion of the vertex data may be stored in a cache memory. As such, upon repeated receipt of the index representative of the portion of the vertex data, such portion of the vertex data may be efficiently retrieved from the cache memory, as opposed to repeated retrieval from the system memory.

In still yet another aspect of the present invention, the retrieved portion of the vertex data may be processed in various ways. For example, such processing may include reformatting, transformation, and lighting. Further, the processed vertex data may be stored in a vertex file. This allows retrieval of the processed vertex data from the vertex file upon repeated receipt of an index representative of the portion of the vertex data, without need for time consuming reprocessing. Therefore, the efficiency in which the vertex data is retrieved and processed is improved.

In order to further facilitate the foregoing process, the vertex data may be parsed into vertex data sets which each represent a part, or a triangle, of an image. Such vertex data sets may be organized in a mesh configuration. As such, a first group of vertex data sets may be processed for displaying a first portion of the image. Thereafter, the first group of processed vertex data sets is stored in a vertex file in memory. Next, after a second group of vertex data sets is processed, the first group of processed vertex data sets may be retrieved from the vertex file in memory for use with the second group of processed vertex data sets for displaying a second portion of the image. It should be noted that in one embodiment the storage and retrieval of the vertex data sets to and from the vertex file may be carried out in a first in, first out (FIFO) format. Accordingly, the efficiency in which the vertex data is retrieved and processed is still further improved.

BRIEF DESCRIPTION OF THE DRAWINGS

The foregoing aspects are better understood from the following detailed description of one embodiment of the invention with reference to the drawings, in which.

DESCRIPTION OF THE PREFERRED EMBODIMENTS

Figure 1:
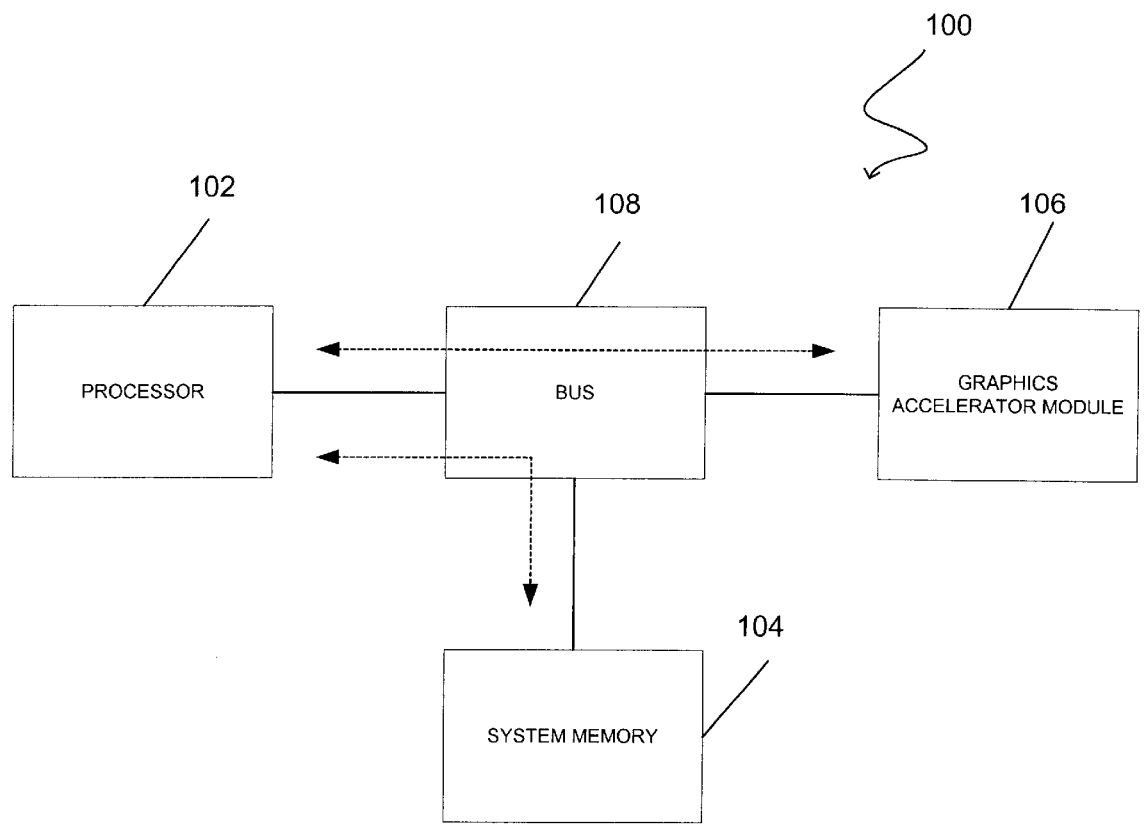
FIG. 1 is a block diagram illustrating the flow of vertex data in a system of the prior art.

FIG. 1 illustrates a prior art system for retrieving graphics vertex data from memory via a processor. With reference now to FIGS. 1 through 7, the present invention includes a system for allowing direct memory access to graphics vertex data by a graphics accelerator module.

Figure 2:
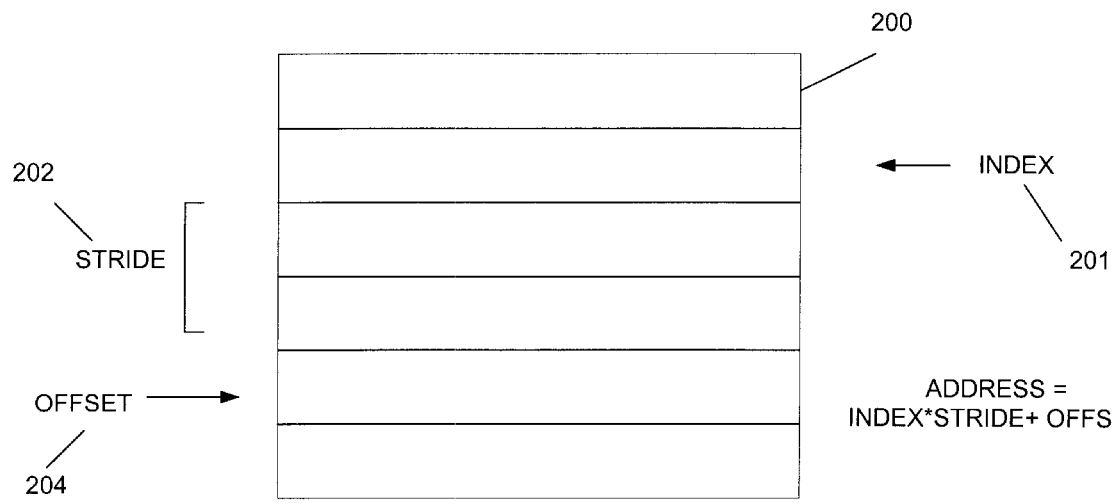
FIG. 2 is an illustration of vertex data stored in memory in accordance with one embodiment of the present invention.

As shown in FIG. 2, in one embodiment, the vertex data is stored in an array 200 including a plurality of components such as position (X Y Z W), diffuse(R G B A), specular(R G B F), texture0 (S T R Q), texture1 (S T R Q), fog (F), and/or any other components. For reasons that will soon become apparent, multiple additional components of the vertex data are provided including normal (Nx Ny Nz) and weight (W). It should be noted that the vertex data may include any type of components representative of various aspects of an image. An example of the various components of the vertex data of one embodiment of the present invention is shown in Table 2.

TABLE 2

| | |
|---|---|
| position(X Y Z W) | [stride0, offset0, format0] |
| diffuse(R G B A) | [stride1, offset1, format1] |
| specular(R G B F) | [stride2, offset2, format2] |
| texture0(S T R Q) | [stride3, offset3, format3] |
| texture1(S T R Q) | [stride4, offset4, format4] |
| fog(F) | [stride5, offset5, format5] |
| normal(Nx Ny Nz) | [stride6, offset6, format6] |
| weight(W) | [stride7, offset7, format7] |

In use, the foregoing vertex data may be employed to display portions, or triangles, of an image. Accordingly, different portions of the vertex data represent different portions of the image.

In order to identify a location in memory in which the vertex data is stored, a calculation is executed. Such calculation is carried out using an index 201 in addition to a stride value 202 and an offset value 204. With reference to FIG. 2, the calculation includes multiplying the index 201 by a stride value 202 and adding an offset value 204 thereto in order to determine the appropriate location in memory. It should be noted that the foregoing values are stored in associated registers.

As mentioned earlier, the vertex data includes a plurality of components. In one embodiment, each of such components has an associated stride value 202 and offset value 204 that are used in the foregoing calculation. Note Table 2. By assigning each component of the vertex data different index, stride and offset values, such components may be stored in different configurations.

Figure 3:
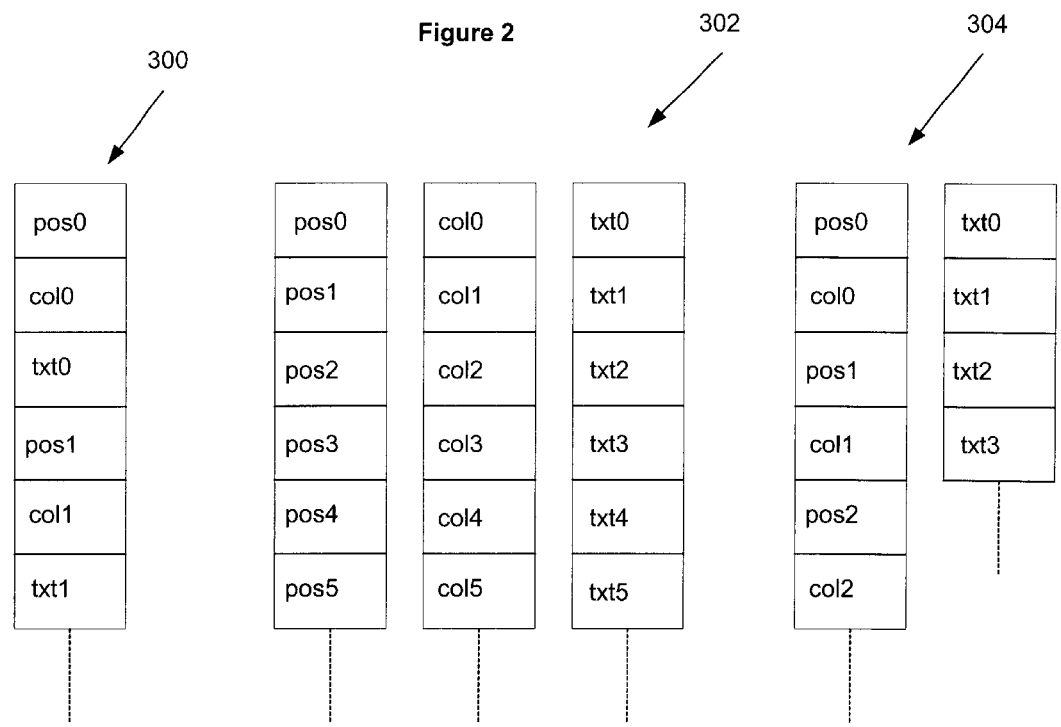
FIG. 3 is an illustration of possible configurations in which various components of the vertex data may be stored in accordance with one embodiment of the present invention.

FIG. 3 shows various examples of configurations in which the components of the vertex data may be organized. For example, the components of the vertex data may take on an interleaved configuration 300 with the components alternately situated in an array. In another example, the components of the vertex data may be independently separated in a second configuration 302. Still yet, the components of the vertex data may be mixed randomly in a third configuration 304. In various other embodiments, the components may be configured in any other way that results in the data being separated. The various components of the vertex data may thus be retrieved independently from different locations in memory.

In addition to the stride and offset values, each of the components of the vertex data may have an associated format value. See Table 2. In one embodiment, the format value of each component of the vertex data may include a size parameter, type parameter, and/or flag parameter.

The size parameter of the format value is indicative of a size of the corresponding component of the vertex data. 1, 2, 3, etc. are each acceptable values of the size parameter. It should be noted that a 0 value of size indicates a disabling function. Further, the type parameter of the format value represents an amount of memory required by an associated component of the vertex data. The type parameter may include values of "byte", "short", and "float" which indicate 1 byte, 2 bytes, and 4 bytes of memory, respectively. Finally, other types of flags may be employed to convey information other than the size and amount of memory represented by the components of the vertex data.

By way of example, in the case of the position (X Y Z W) value, if size=2 and type=float, it is known that only two parameters, i.e. XY, etc., each of 4 bytes (1 float) in length exist in memory. This facilitates efficient retrieval of the vertex data and further allows data compression by removing unwanted data. Unwanted data, for example, may include the W parameter of the position (X Y Z W) value during a transform and lighting operation. For the above example, it should be noted that internally appropriate defaults are supplied for unspecified elements, i.e. Z=0 and W=1.

Figure 4:
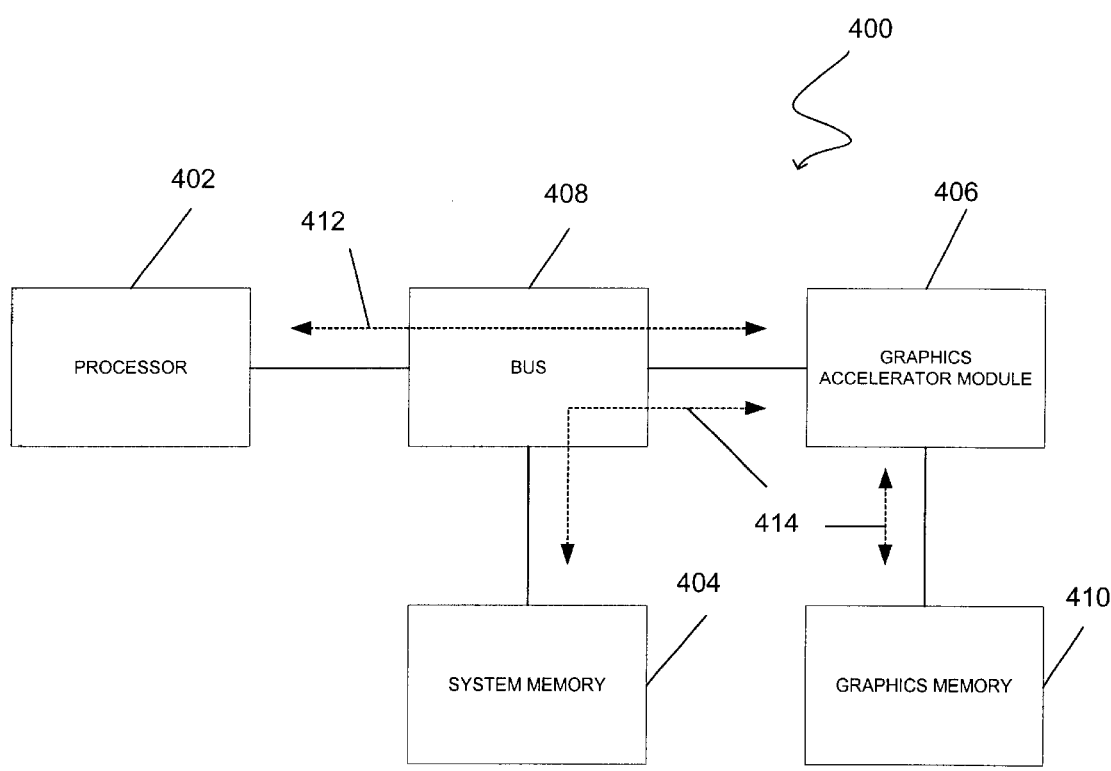
FIG. 4 is a block diagram illustrating the flow of the vertex data in accordance with one embodiment of the present invention.

FIG. 4 shows the flow of the vertex data during use of a system 400 in accordance with one embodiment of the present invention. As shown, a processor 402, system memory 404, and a graphics accelerator module 406 are interconnected via a bus 408. Further, the graphics accelerator module 406 is equipped with graphics memory 410.

In operation, the vertex data is stored or loaded in memory. It should be noted that the memory in which the vertex data is stored may include the system memory 404 or the graphics memory 410 associated with the graphics accelerator module 406. Next, an index is received by the graphics accelerator module 406 which is representative of a portion of the vertex data in the memory. Note data flow path for index 412. From this a location is then determined in the memory in which the portion of the vertex data is stored. Such portion of the vertex data may thereafter be directly retrieved from the determined location in memory while bypassing the processor 402, as shown in data flow path 414. It should be noted that during such direct memory access (DMA), memory must be locked down in a manner that is well known to those of ordinary skill in the art.

The present invention thus considerably relieves the processor bus 408. The indices 201 typically consist of 16 bits of information and may be increased up to 32 bits or more. Further, the system 400 is typically required to handle approximately 10 million vertices per second, or more in future implementations. Accordingly, in the case where the vertices each consist of 16 bits, data enters the processor 402 via the processor bus 408 at 20 MB/s while data exits the processor 402 via the processor bus 408 at a similar rate of 20 MB/s. This results is in a total of 40 MB/s of data being handled by the processor bus 408 which is a considerable reduction with respect to the 800 MB/s required in prior art systems. Further, the processor cache is maintained by not passing large amounts of vertex data through it.

Figure 5:
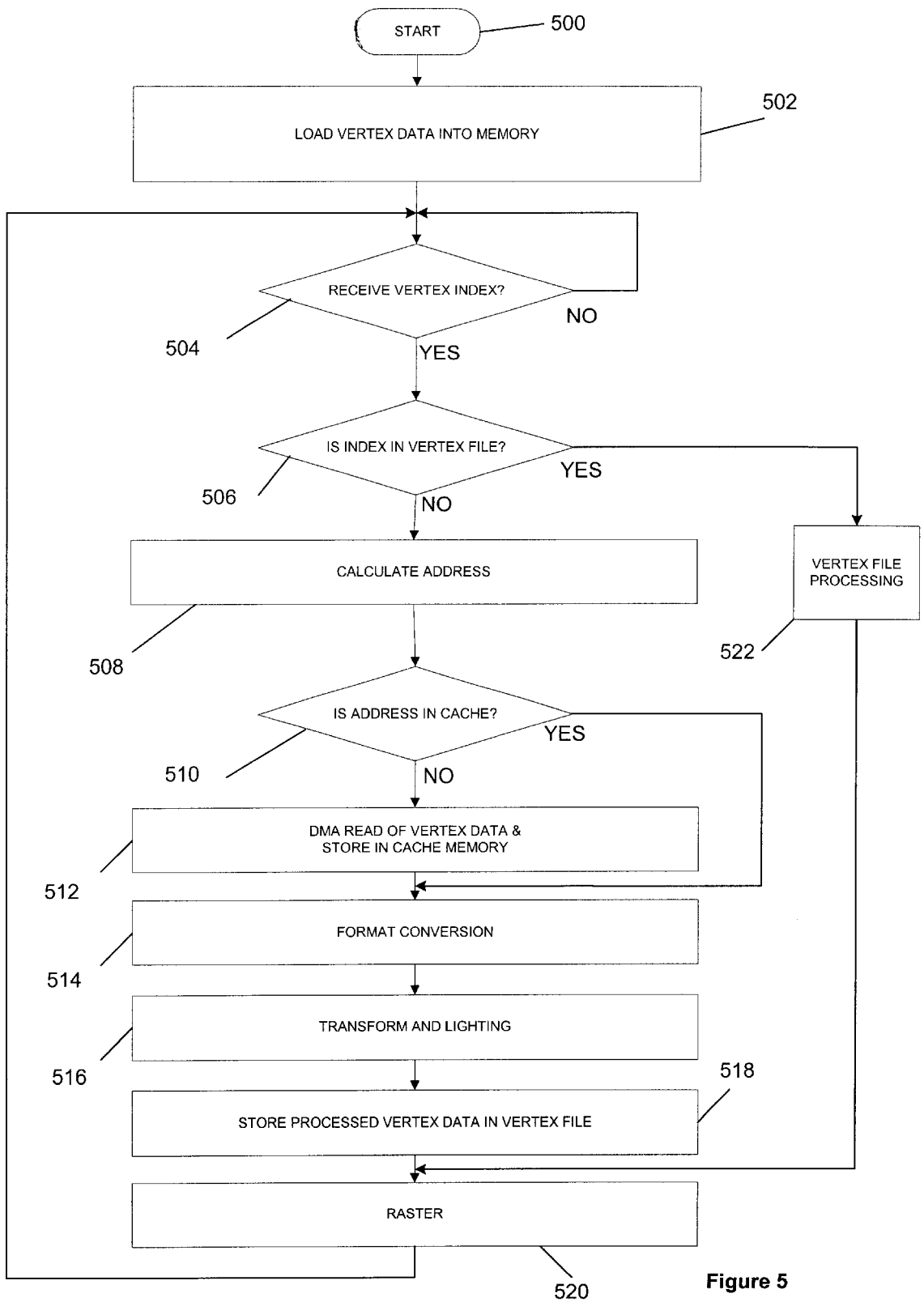
FIG. 5 is a flowchart showing a process of managing the vertex data in accordance with one embodiment of the present invention.

FIG. 5 is a detailed flowchart showing the foregoing process of managing vertex data. It should be noted that the process of FIG. 5 may be implemented by either software or hardware logic. The process begins in operation 500. Next, processor 402 in the system memory 404 or graphics memory 410 in operation 502 stores the vertex data. It is then determined whether indices have been received in decision 504 and whether the vertex data is currently stored in a vertex file in decision 506. Upon receipt of at least one index and the absence of the vertex data in the vertex file, the aforementioned calculation is carried out in order to locate the associated portion of the vertex data in memory. See operation 508.

Before performing a direct memory access read of the vertex data in the system or graphics memory 410 in operation 512, it first determined in decision 510 whether the vertex data is currently stored in cache memory as a result of a previous execution of operation 512. It should be noted that the cache memory stores the vertex data in terms of addresses similar to those employed by processor caches. If such vertex data is stored in cache memory, the retrieval of the vertex data from the system or graphics memory is not necessary and operation 512 is skipped. As such, upon repeated receipt of an index representative of the portion of the vertex data, such portion of the vertex data may be efficiently retrieved from the cache memory, as opposed to repeated retrieval from the system or graphics memory.

With continuing reference to FIG. 5, the format of the retrieved portion of the vertex data may be converted in operation 514. Such an operation is a conventional step in the processing of vertex data and is well known to those skilled in the art. Next, in operation 516, a transform and lighting operation is carried out. Similar to the format conversion operation, the transform and lighting operation is a conventional step in the processing of vertex data and is well known to those skilled in the art. It should be noted that the normal (Nx Ny Nz) and weight (W) values of the vertex data are important during the current transform and lighting operation for an on-chip transform operation on the accelerator module 406 which converts the data into a standard 4-element float format.

After the transform and lighting operation is executed, the processed vertex data is stored in a vertex file in operation 518. It should be noted that the processed vertex data is stored in the vertex file in terms of the associated index. Thereafter, a conventional raster operation is executed in operation 520, after which the loop is continued with decision 504.

With reference again to decision 506, it is determined whether the vertex data is present in the vertex file. If the vertex data is currently stored in the vertex file as a result of a previously executed operation 518, such processed vertex data may be retrieved immediately in operation 522. This allows retrieval of the processed vertex data from the vertex file upon repeated receipt of an index representative of the portion of the vertex data. Therefore, the efficiency with which the vertex data is retrieved and processed is improved.

Figure 6:
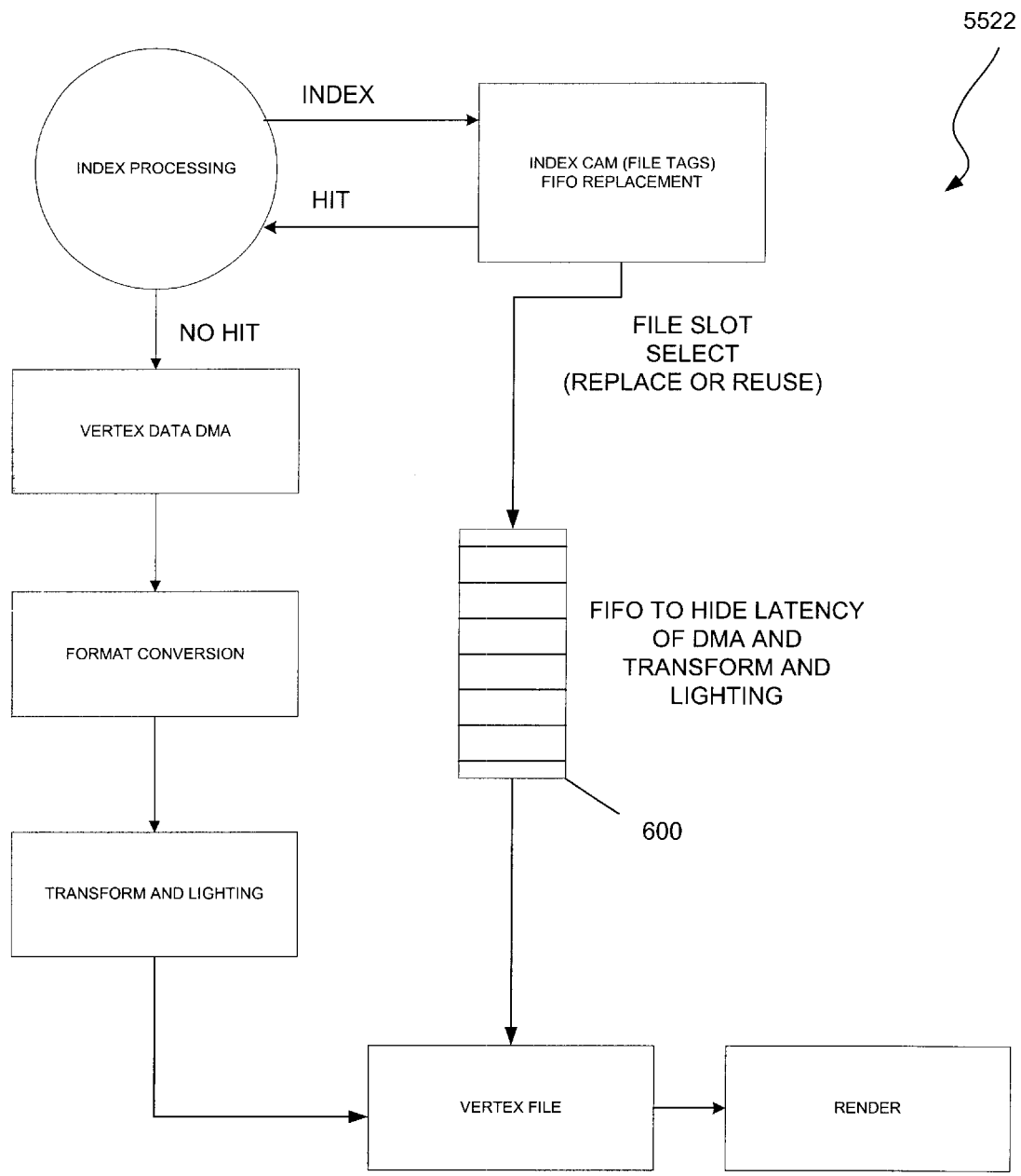
FIG. 6 is a flowchart showing a process of managing the vertex data in accordance with one embodiment of the present invention.

FIG. 6 shows a more detailed view of a data flow for replacing vertices in the vertex file for maximized reuse of mesh vertices. As shown, a file slot select command of reuse (see operation 522 of FIG. 5) or replace (see operation 508 of FIG. 5) is sent to a first in, first out (FIFO) queue buffer 600 to hide the latency of direct memory access (DMA) and the transform and lighting operations.

In order to maintain synchronicity during the management of the vertex data in the vertex file, the transform and lighting operation is stalled until a file replace command is received. Upon receipt of the file replace command, the transform and lighting operation resumes during which the current file slot is invalidated. Only after the vertex data has been processed is the file slot validated. When the file replace command arrives, such command is converted to a reuse command that, upon receipt, requires a wait for a valid file slot. Thereafter, the vertex data in the file slot is copied to the render pipeline. During the foregoing process, the preservation of order allows the vertex file state to match a prediction.

Figure 7:
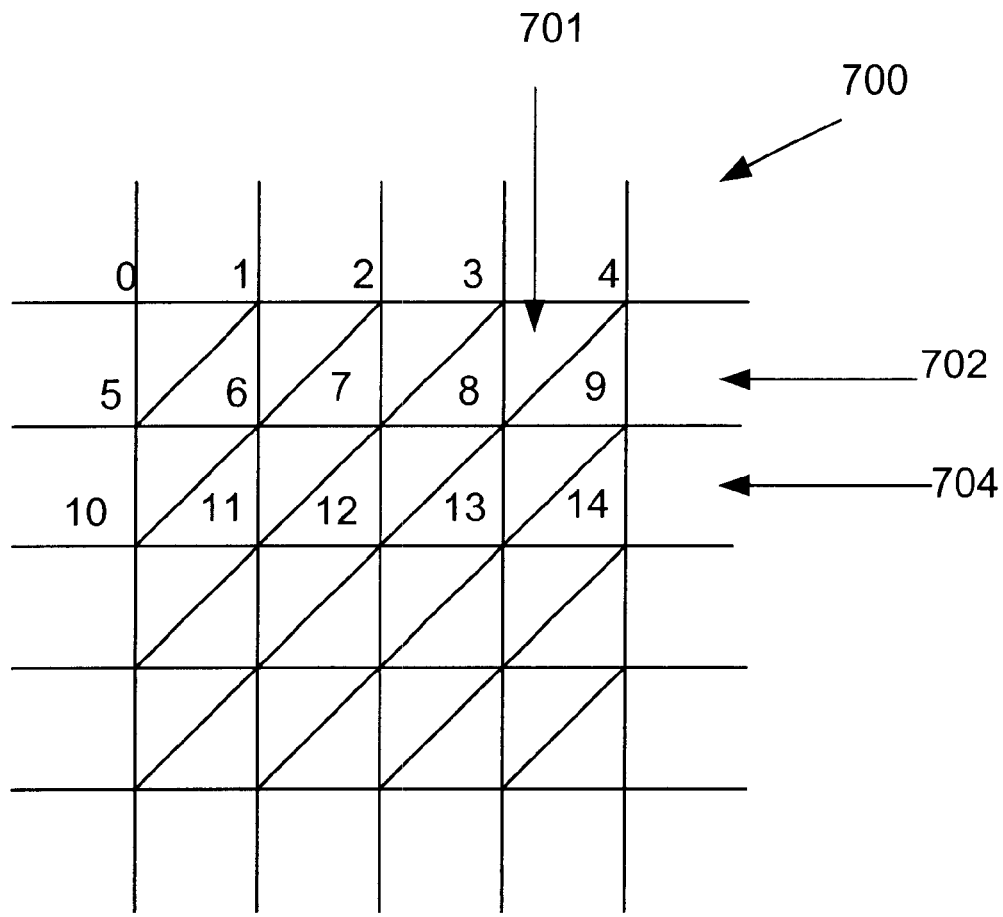
FIG. 7 is an illustration of a plurality of sets of the vertex data adapted for representing a plurality of portions of an image in a mesh configuration.

Turning now to FIG. 7, in order to further facilitate the foregoing process, the vertex data may be strategically parsed into vertex data sets which each represent a part of an image 700. Such vertex data sets may be organized as a mesh of individual triangles 701. As such, a first group of vertex data sets (0–9) may be processed for displaying a first portion 702 of the image. Thereafter, the first group of processed vertex data sets is stored in a vertex file in memory. Next, after a second group of vertex data sets (10–14) is processed, at least part of the first group of processed vertex data sets (5, 6, 7, 8, 9, etc.) may be retrieved from the memory in order to use with the second group of processed vertex data sets for displaying a second portion 704 of the image. In one embodiment, the foregoing technique may effect an efficiency that approaches 2 triangles/vertex.

The present invention thus permits extremely high vertex processing rates via OpenGL vertex arrays or D3D vertex buffers even when the processor lacks the necessary data movement bandwidth. By passing indices in lieu of the vertex data, the processor is capable of keeping up with the rate at which a vertex engine of the graphics accelerator module can consume vertices. In operation, the processor passes vertex indices to the hardware and lets the hardware "pull" the actual vertex data via direct memory access (DMA). It should be noted that the current OpenGL 1.1 vertex array functionality has semantic constraints that complicate the foregoing process. Thus, in one embodiment of the present invention, a vertex array range extension may be employed.

The vertex array range extension provides a mechanism for deferring the pulling of vertex array components to facilitate DMA pulling of vertices for fast, efficient vertex array transfers. The OpenGL client need only pass vertex indices to the hardware which can DMA the actual vertex data directly out of the client address space.

The OpenGL 1.1 vertex array functionality specifies a fairly strict coherency model for when OpenGL extracts vertex data from a vertex array and when the application can update the in memory vertex array data. The OpenGL 1.1 specification says "Changes made to array data between the execution of Begin and the corresponding execution of End may affect calls to ArrayElement that are made within the same Begin/End period in non-sequential ways. That is, a call to ArrayElement that precedes a change to array data may access the changed data, and a call that follows a change to array data may access the original data."

This means that by the time End returns (and DrawArrays and DrawElements return since they have implicit Ends), the actual vertex array data must be transferred to OpenGL. This strict coherency model prevents one from simply passing vertex element indices to the hardware and having the hardware "pull" the vertex data out (which is often after the End for the primitive has returned to the application).

Relaxing this coherency model and bounding the range from which vertex array data can be pulled is important to making OpenGL vertex array transfers faster and more efficient.

The first task of the vertex array range extension is to relax the coherency model so that hardware can indeed "pull" vertex data from the OpenGL client's address space long after the application has completed sending the geometry primitives requiring the vertex data.

A second complication with the OpenGL 1.1 vertex array functionality is the lack of any guidance from the API about what region of memory vertices can be pulled from. There is no size limit for OpenGL 1.1 vertex arrays. Any vertex index that points to valid data in all enabled arrays is available. This makes it hard for a vertex DMA engine to pull vertices since they can be potentially pulled from anywhere in the OpenGL client address space.

The vertex array range specifies a range of the OpenGL client's address space where vertices can be pulled. Vertex indices that access any array elements outside the vertex array range are specified to be undefined, possibly without warning. This permits hardware to DMA from finite regions of OpenGL client address space, making DMA engine implementation far more tractable.

The extension is specified such that an (error free) OpenGL client using the vertex array range functionality could no-op its vertex array range commands and operate equivalently to (if slower than) using the vertex array range functionality.

If one falls back to software transformation, there is no need to abide by ignoring vertices outside the vertex array range.

In use, a programmer need not be given a sense of how big a vertex array range he or she can specify. It should be merely documented if there are limitations.

It should be noted that the concepts relating to ArrayElement also applies to DrawArrays and DrawElements. The OpenGL 1.1 specification is clear that DrawArrays and DrawElements are defined in terms of ArrayElement.

A plurality of new procedures and functions are as follows:
void VertexArrayRangeNV(sizei length, void*pointer)
void FlushVertexArrayRangeNV(void)
A plurality of new tokens are as follows:
Accepted by the <cap> parameter of EnableClientState, DisableClientState, and IsEnabled:
VERTEX_ARRAY_RANGE_NV 0x851d Accepted by the <pname> parameter of GetBooleanv, GetIntegerv, GetFloatv, and GetDoublev:
VERTEX_ARRAY_RANGE_LENGTH_NV 0x851e
VERTEX_ARRAY_RANGE_VALID_NV 0x851f
MAX_VERTEX_ARRAY_RANGE_ELEMENT_NV 0x8520

Accepted by the <pname> parameter of GetPointerv:
VERTEX_ARRAY_RANGE_POINTER_NV 0x8521

Additional information that supplements Chapter 2 of the 1.1 Specification (OpenGL Operation) will now be set forth. After the discussion of vertex arrays (Section 2.8), description of the vertex array range may be necessary. VertexArrayRangeNV specifies the current vertex array range. When the vertex array range is enabled, vertex array vertex transfers from within the vertex array range are potentially faster. The vertex array range is a contiguous region of address space for placing vertex arrays. The vertex array range address space region extends from "pointer" to "pointer+length−1" inclusive. When specified and enabled, vertex array vertex transfers from within the vertex array range are potentially faster.

If, for operating system dependent reasons, the vertex array range cannot be set up, the OUT_OF_MEMORY error occurs and the vertex array range valid bit is cleared and the vertex array range pointer and length are not updated. If the vertex array range can be set up, the vertex array range valid bit is set and the vertex array range and pointer are updated.

The vertex array range is enabled or disabled by calling Enable or Disable with the symbolic constant VERTEX_ARRAY_RANGE_NV. If the vertex array range valid bit is not set, an Enable for the vertex array range is ignored.

When the vertex array range is enabled, ArrayElement commands are permitted (but not required) to ignore any indexed elements of the enabled arrays are not within the vertex array range. If an index element is ignored, the resulting vertex is undefined. When the vertex array range is enabled, ArrayElement commands are permitted (but not required) to ignore any array element indices less than zero or greater than the value of MAX_VERTEX_ARRAY_RANGE_ELEMENT_NV, an implementation defined limit. If an index element is undefined, no warning may be given.

Enabling the vertex array range relaxes the vertex array coherency model that specifies how vertex data can be extracted from the vertex array memory after the Begin/End transferring the vertices.

When the vertex array range is enabled, changes made to array data until the next "vertex array range flush" may affect calls to ArrayElement in non-sequential ways. That is a call to ArrayElement that precedes a change to array data (without an intervening "vertex array range flush") may access the changed data, and a call that follows a change (without an intervening "vertex array range flush") to array data may access original data.

A "vertex array range flush" occurs when one of the following operations occur:
Finish returns.
FlushVertexArrayRangeNV returns.
VertexArrayRangeNV returns.
ClientStateDisable of VERTEX_ARRAY_RANGE_NV returns.
ClientStateEnable of VETEX_ARRAY_RANGE_NV returns.

The client state required to implement the vertex array range consists of an enable bit, a memory pointer, an integer size, and a valid bit.

Addition information that supplements Chapter 5 of the 1.1 Specification (Special Functions) will now be set forth. VertexArrayRangeNV and FlushVertexArrayRangeNV are not complied into display lists but are executed immediately.

Additional information that supplements the GLX Specification will now be set forth. OpenGL implementations using GLX should fail to set up the vertex array range (failing to set the vertex array valid bit so the vertex array range functionality is not usable).

An example of an error is as follows:

OUT_OF_MEMORY is generated if VertexArrayRange cannot initialize the vertex array range for operating system dependent reasons.

A plurality of new states is set forth in Table 3.

TABLE 3

| Get Value | Get Command | Type | Value | Attrib |
| --- | --- | --- | --- | --- |
| VERTEX_ARRAY_RANGE_NV | IsEnabled | B | False | vertex-array |
| VERTEX_ARRAY_RANGE_POINTER_NV | GetPointerv | Z+ | n/a | vertex-array |
| VERTEX_ARRAY_RANGE_LENGTH_NV | GetIntegerv | Z+ | n/a | vertex-array |
| VERTEX_ARRAY_RANGE_VALID_NV | GetBooleanv | B | False | vertex-array |

A new implementation dependent state is forth in Table 4.

TABLE 4

| Get Value | Get Command | Type | Minimum Value |
| --- | --- | --- | --- |
| MAX_VERTEX_ARRAY_RANGE_ELEMENT_NV | GetIntegerv | Z+ | 65535 |

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for allowing direct memory access to graphics vertex data by a graphics accelerator module, comprising:

storing vertex data in memory;

receiving an index representative of a portion of the vertex data in the memory;

determining a location in the memory in which the portion of the vertex data is stored; and retrieving the portion of the vertex data directly from the determined location in the memory;

wherein the location in the memory is determined by carrying out a calculation using the index;

wherein the calculation includes multiplying the index by a stride value and adding an offset value thereto in order to determine the location in the memory;

wherein the vertex data includes a plurality of components each of which has a separate associated stride value and offset value;

wherein each of the components of the vertex data includes at least one associated format value indicative of a size and type of the corresponding component of the vertex data;

wherein the vertex data is situated in an interleaved configuration;

wherein the vertex data includes normal data, texture data, color data, and weight data.

2. The method as recited in claim 1, wherein the memory includes system memory.

3. The method as recited in claim 1, wherein the memory includes memory of the graphics accelerator module.

4. The method as recited in claim 1, wherein after retrieving the portion of the vertex data, the method further includes the operations of: caching the portion of the vertex data in a cache memory; and retrieving the portion of the vertex data from the cache memory upon repeated receipt of an index representative of the portion of the vertex data.

5. The method as recited in claim 1, wherein after retrieving the portion of the vertex data, processing the portion of the vertex data.

6. The method as recited in claim 5, wherein the processing includes reformatting and transformation.

7. The method as recited in claim 5, wherein after processing of the vertex data, the method further includes the operations of storing the processed vertex data in a vertex file; and retrieving the processed vertex data from the vertex file upon repeated receipt of the index representative of the portion of the vertex data.

8. A system for allowing direct memory access to graphics vertex data, comprising:

memory for storing vertex data;

a graphics accelerator module for receiving an index representative of a portion of the vertex data in the memory; and a processor for determining a location in the memory in which the portion of the vertex data is stored;

wherein the graphics accelerator module is adapted for retrieving the portion of the vertex data directly from the determined location in the memory;

wherein the location in the memory is determined by carrying out a calculation using the index;

wherein the calculation includes multiplying the index by a stride value and adding an offset value thereto in order to determine the location in the memory;

wherein the vertex data includes a plurality of components each of which has a separate associated stride value and offset value;

wherein each of the components of the vertex data includes at least one associated format value indicative of a size and type of the corresponding component of the vertex data;

wherein the vertex data is situated in an interleaved configuration;

wherein the vertex data includes normal data, texture data, color data, and weight data.

9. The system as recited in claim 8, wherein the memory includes system memory.

10. The system as recited in claim 8, wherein the memory includes memory of the graphics accelerator module.

11. The system as recited in claim 8, wherein after retrieving the portion of the vertex data, the system further includes: means for caching the portion of the vertex data in a cache memory; and means for retrieving the portion of the vertex data from the cache memory upon repeated receipt of an index representative of the portion of the vertex data.

12. The system as recited in claim 8, wherein after retrieving the portion of the vertex data, the portion of the vertex data is processed.

13. The system as recited in claim 12, wherein the processing includes reformatting and transformation.

14. The system as recited in claim 12, wherein after processing of the vertex data, the system further includes logic for storing the processed vertex data in a vertex file; and logic for retrieving the processed vertex data from the vertex file upon repeated receipt of the index representative of the portion of the vertex data.

15. A computer program embodied on a computer readable medium for allowing direct memory access to graphics vertex data by a graphics accelerator module, comprising:
   a code segment for storing vertex data in memory;
   a code segment for receiving an index representative of a portion of the vertex data in the memory;
   a code segment for determining a location in the memory in which the portion of the vertex data is stored; and
   a code segment for retrieving the portion of the vertex data directly from the determined location in the memory;
   wherein the location in the memory is determined by carrying out a calculation using the index;
   wherein the calculation includes multiplying the index by a stride value and adding an offset value thereto in order to determine the location in the memory;
   wherein the vertex data includes a plurality of components each of which has a separate associated stride value and offset value;
   wherein each of the components of the vertex data includes at least one associated format value indicative of a size and type of the corresponding component of the vertex data;
   wherein the vertex data is situated in an interleaved configuration;
   wherein the vertex data includes normal data, texture data, color data, and weight data.

16. The computer program as recited in claim 15, wherein the computer program is suitable for storing the vertex data in system memory.

17. The computer program as recited in claim 15, wherein the computer program is suitable for storing the vertex data in graphics accelerator module memory.

18. The computer program as recited in claim 15, wherein after retrieving the portion of the vertex data, the computer program further includes: a code segment for caching the portion of the vertex data in a cache memory; and a code segment for retrieving the portion of the vertex data from the cache memory upon repeated receipt of an index representative of the portion of the vertex data.

19. The computer program as recited in claim 15, wherein after retrieving the portion of the vertex data, the portion of the vertex data is processed.

20. The computer program as recited in claim 19, wherein the processing includes reformatting and transformation.

21. The computer program as recited in claim 19, wherein after processing of the vertex data, the computer program further includes a code segment for storing the processed vertex data in a vertex file; and a code segment for retrieving the processed vertex data from the vertex file upon repeated receipt of the index representative of the portion of the vertex data.

22. A method for allowing direct memory access to graphics data by a graphics accelerator module, comprising:
   (a) identifying a stride value and an offset value associated with graphics data;
   (b) determining a range in memory in which the graphics data is stored based at least in part on the stride value and the offset value; and
   (c) directly accessing the graphics data in the range in the memory;
   wherein the range in memory in which the graphics data is stored is determined based on a calculation including at least in part multiplying an index by a stride value and adding an offset value thereto;
   wherein the graphics data includes a plurality of components each of which has a separate associated stride value and offset value;
   wherein each of the components of the graphics data includes at least one associated format value indicative of a size and type of the corresponding component of the graphics data;
   wherein the graphics data is situated in an interleaved configuration;
   wherein the graphics data includes normal data, texture data, color data, and weight data.

23. A method as recited in claim 22, wherein the graphics data is retrieved when accessed.

24. A method for allowing direct memory access to graphics data by a graphics accelerator module, comprising:
   (a) identifying a stride, an offset, and a format associated with graphics data;
   (b) locating graphics data stored in memory based at least in part on the stride, the offset, and the format; and
   (c) directly accessing the graphics data in the memory;
   wherein the graphics data includes a plurality of components each of which has a separate associated stride value and offset value;
   wherein each of the components of the graphics data includes at least one associated format value indicative of a size and type of the corresponding component of the graphics data;
   wherein the graphics data is situated in an interleaved configuration;
   wherein the graphics data includes normal data, texture data, color data, and weight data.

25. A data structure stored in memory for allowing direct memory access to graphics data by a graphics accelerator module, comprising:
   (a) parameter objects identifying a stride, an offset, and a format associated with graphics data;
   wherein the graphics data is stored in memory, and is directly accessed based at least in part on the stride, the offset, and the format;

wherein the graphics data includes a plurality of components each of which has a separate associated stride value and offset value;

wherein each of the components of the graphics data includes at least one associated format value indicative of a size and type of the corresponding component of the graphics data;

wherein the graphics data is situated in an interleaved configuration;

wherein the graphics data includes normal data, texture data, color data, and weight data.

26. A data structure stored in memory for allowing direct memory access to graphics data by a graphics accelerator module, comprising:

(a) parameter objects identifying a size and a type associated with graphics data;

wherein the graphics data is stored in memory, and is directly accessed based at least in part on the size and the type;

wherein the graphics data includes a plurality of components each of which has a separate associated stride value and offset value;

wherein each of the components of the graphics data includes at least one associated format value indicative of the size and type of the corresponding component of the graphics data;

wherein the graphics data is situated in an interleaved configuration;

wherein the graphics data includes normal data, texture data, color data, and weight data.

27. A data structure as recited in claim 25, wherein the graphics data includes:

position (X Y Z W) [stride0, offset0, format0];

diffuse(R G B A) [stride1, offset1, format1];

specular(R G B F) [stride2, offset2, format2];

texture0 (S T R Q) [stride3, offset3, format3];

texture1 (S T R Q) [stride4, offset4, format4];

fog(F) [stride5, offset5, format5];

normal (Nx Ny Nz) [stride6, offset6, format6]; and weight (W) [stride7, offset7, format 7].

* * * * *